(12) United States Patent
Curtis

(10) Patent No.: US 9,758,226 B1
(45) Date of Patent: Sep. 12, 2017

(54) WATERCRAFT PROPULSION SYSTEM

(71) Applicant: Birdon (UK) Limited, Denver, CO (US)

(72) Inventor: Timothy Curtis, Denver, CO (US)

(73) Assignee: Birdon (UK) Limited, Denver, CO (US)

( * ) Notice: Subject to any disclaimer, the term of this patent is extended or adjusted under 35 U.S.C. 154(b) by 0 days.

(21) Appl. No.: 15/354,039

(22) Filed: Nov. 17, 2016

(51) Int. Cl.
| | | |
|---|---|---|
| *B63H 11/08* | (2006.01) | |
| *B60F 3/00* | (2006.01) | |
| *B63H 25/46* | (2006.01) | |
| *B63H 11/11* | (2006.01) | |
| *B63H 11/00* | (2006.01) | |

(52) U.S. Cl.
CPC ............ *B63H 11/08* (2013.01); *B60F 3/0015* (2013.01); *B63H 11/11* (2013.01); *B63H 25/46* (2013.01); *B63H 2011/008* (2013.01); *B63H 2011/081* (2013.01)

(58) Field of Classification Search
CPC . B63H 1/14; B63H 1/18; B63H 11/00; B63H 11/02; B63H 11/08; B63H 11/103
USPC ................................................ 440/12.51, 38
See application file for complete search history.

(56) References Cited

U.S. PATENT DOCUMENTS

| | | |
|---|---|---|
| 5,752,862 A | 5/1998 | Mohler et al. |
| 5,759,074 A * | 6/1998 | Jones ............... B63H 11/08 440/38 |
| 5,863,229 A | 1/1999 | Matte |
| 6,135,831 A | 10/2000 | Lanni et al. |
| 6,991,499 B2 * | 1/2006 | Facinelli ........... B63H 11/08 440/47 |
| 2003/0036318 A1 | 2/2003 | Forest et al. |

\* cited by examiner

*Primary Examiner* — Lars A Olson (57) ABSTRACT

A watercraft propulsion system is disclosed for an amphibious vessels. The watercraft propulsion system includes a waterjet on each side of the vessel which consist mainly of an impeller, inlet assembly, and stator assembly. The waterjets resists vibrational fatigue and failure through specialized welding between the struts and the inside of the conduit of the inlet assembly. The waterjets can be retrofitted to existing drive shafts to meet the performance requirements of differing amphibious and other marine vessels and to accommodate space limitations. The waterjets are easily installed and removed.

24 Claims, 5 Drawing Sheets

Exploded view of waterjet.

FIGURE 1

Exploded view of waterjet.

FIGURE 2

Cross section view of waterjet system.

FIGURE 3

End view of the waterjet depicting the inlet assembly struts.

FIGURE 4

One embodiment of the system with the placement of the waterjet on an amphibious vehicle.

FIGURE 5

Side view of the assembled waterjet.

WATERCRAFT PROPULSION SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

FIELD OF THE INVENTION

The present invention relates to the field of nautical propulsion. More specifically, this invention relates to a waterjet apparatus that is capable of withstanding rigorous strain such as from ground transportation and transition from the marine to land (and vice versa) environments, while being assembled in a manner that allows for easy access to waterjet's components for removal, installation, maintenance and/or repair.

DESCRIPTION OF THE DRAWINGS

The drawings constitute a part of this specification and include exemplary embodiments of the Watercraft Propulsion System, which may be embodied in various forms. It is to be understood that in some instances, various aspects of the invention may be shown exaggerated or enlarged to facilitate an understanding of the invention. It should be understood that the drawings are not necessarily to scale; instead, emphasis has been placed upon illustrating the principles of the invention. In addition, in the embodiments depicted herein, like reference numerals in the various drawings refer to identical or near identical structural elements.

BACKGROUND OF THE INVENTION

Waterjet propulsion systems comprise one or more waterjets that increase the speed of water as it passes through the system. The power to drive the waterjet pump is typically provided by a gasoline or diesel engine, or in some cases, by a gas turbine, electric motor, or hydraulic motor. Water from an intake system in the vessel is fed through an inlet assembly and into an inboard impeller which adds energy to the water. From the impeller, the water flows through a stator which removes water swirl generated by the impeller, effectively straightening the flow. The water is then discharged at the stern through a stator assembly nozzle as a straight, high speed jet producing acceleration that generates thrust which propels the vessel.

Waterjets can be used for nearly any vessel or marine application including but not limited to ferries, high-speed watercraft, shallow water operations, and yachts. One application for waterjets includes amphibious watercraft such as ship-to-shore troop transporters or Amphibious Assault Vehicles ("AAV"). An AAV is an armed and armored military vessel with a boat-like hull designed to deliver assault troops and their equipment from ship to shore during military operations. A typical AAV weighs approximately 25 tons and has top speeds of about 8 knots in water.

During land use, a typical AAV employs a power driven continuous track that grips the road and propels the vessel. The marine propulsion system must be designed around these tracks and the armored exterior.

A watercraft propulsion system that utilizes waterjets is better suited for AAV applications when compared to a conventional screw propeller. Waterjet propulsion systems offer better maneuverability at low speeds, better operating ability in shallow waters, a higher debris tolerance because the rotating parts are shielded, and high thrust capabilities at the low speeds typical of AAVs.

Despite the obvious advantages over conventional screw propellers, waterjets are not without their drawbacks and AAV application of waterjets still present design challenges. AAVs are designed to carry crew and must also house weapons and other supplies in addition to its land propulsion system. Thus physical space for the water propulsion system is not readily available on an AAV. Additionally, any added volume can impact the hydrodynamics of the vessel. Although these issues are not entirely unique to AAVs, AAVs are particularly illustrative of the issue as they have a heavily restricted intake area due to the tracks, armor, and hull of the vessel and thus require a high power density propulsion system to conserve space and volume.

Many AAVs require a waterjet to be retrofittable to the existing layout and drive shaft. This creates problems with matching torque, horsepower, and RPM requirements of the AAV with volume and design criteria of the waterjet. Additionally, because AAVs operate not only as a watercraft, but also on land, the waterjets are routinely exposed to jolts and vibrations from land travel that are unique to AAVs as compared to other marine vessels. Sea based propulsion systems are not designed to bear the stress caused by prolonged land transportation, particularly the off-road environments in which AAVs are commonly used. Vibrations from land travel act as compounded wear and tear for a sea based propulsion system and components. Thus, such actions can cause serious fabrication and weld failure of a waterjet propulsion system that was designed to bear sea loads.

AAVs are generally used for military operations; any failure in the waterjet propulsion system can be catastrophic to the human personnel on board and mission success. Thus, it is necessary that the system be robust to withstand military operation conditions. Additionally, routine maintenance of the system requires an easy access and removal process to ensure that the military operation is not disrupted. Currently, no waterjet application exists that is capable of consistently withstanding the stress caused by both land and sea travel, while allowing easy access for maintenance and replacement.

For the foregoing reasons, there is a need for a waterjet propulsion system in AAV applications that, in one or more embodiments, is capable of being retrofitted and customized, can withstand vibrational fatigue, and can be easily removed or accessed for maintenance, repair, or replacement, while providing the necessary thrust and propulsion for the applicable task.

DETAILED DESCRIPTION OF THE INVENTION

The subject matter of the present invention is described with specificity herein to meet statutory requirements. However, the description itself is not intended to necessarily limit the scope of claims. Rather, the claimed subject matter might be embodied in other ways to include different components or combinations of components similar to the ones described in this document, in conjunction with other present or future technologies. Furthermore, the described features, structures, or characteristics may be combined in any suitable manner in one or more embodiments. In the following description, numerous specific details are provided, such as examples of materials, connectors, and components. One skilled in the relevant art will recognize, however, that the Watercraft Propulsion System may be practiced without one or more of the specific details, or with other methods, components, materials, and so forth. In other instances, well-known structures, materials, or operations are not shown or described in detail to avoid obscuring aspects of the invention. Other components and apparatuses may be conceived that are equivalent in function, logic, or effect to one or more mechanisms, or portions thereof, of the system.

The present invention provides a watercraft propulsion system for a tracked amphibious assault vehicle that employs waterjets for marine propulsion that resists vibrational fatigue and failure, can be retrofitted to existing drive shafts, and can be easily removed or installed, either in whole or in part.

The watercraft propulsion system generally comprises an intake 39, at least one waterjet 40 connected to the vessel, and a coupling system to couple the impeller drive shaft 7 to the vessel's drive shaft and vessel's engine. The at least one waterjet 40 can be located in any suitable location on the stern of the vessel. In a preferred embodiment, there are two waterjets 40, one mounted on each side of the vessel, equidistant from the longitudinal axis of the vessel.

Figure 1:
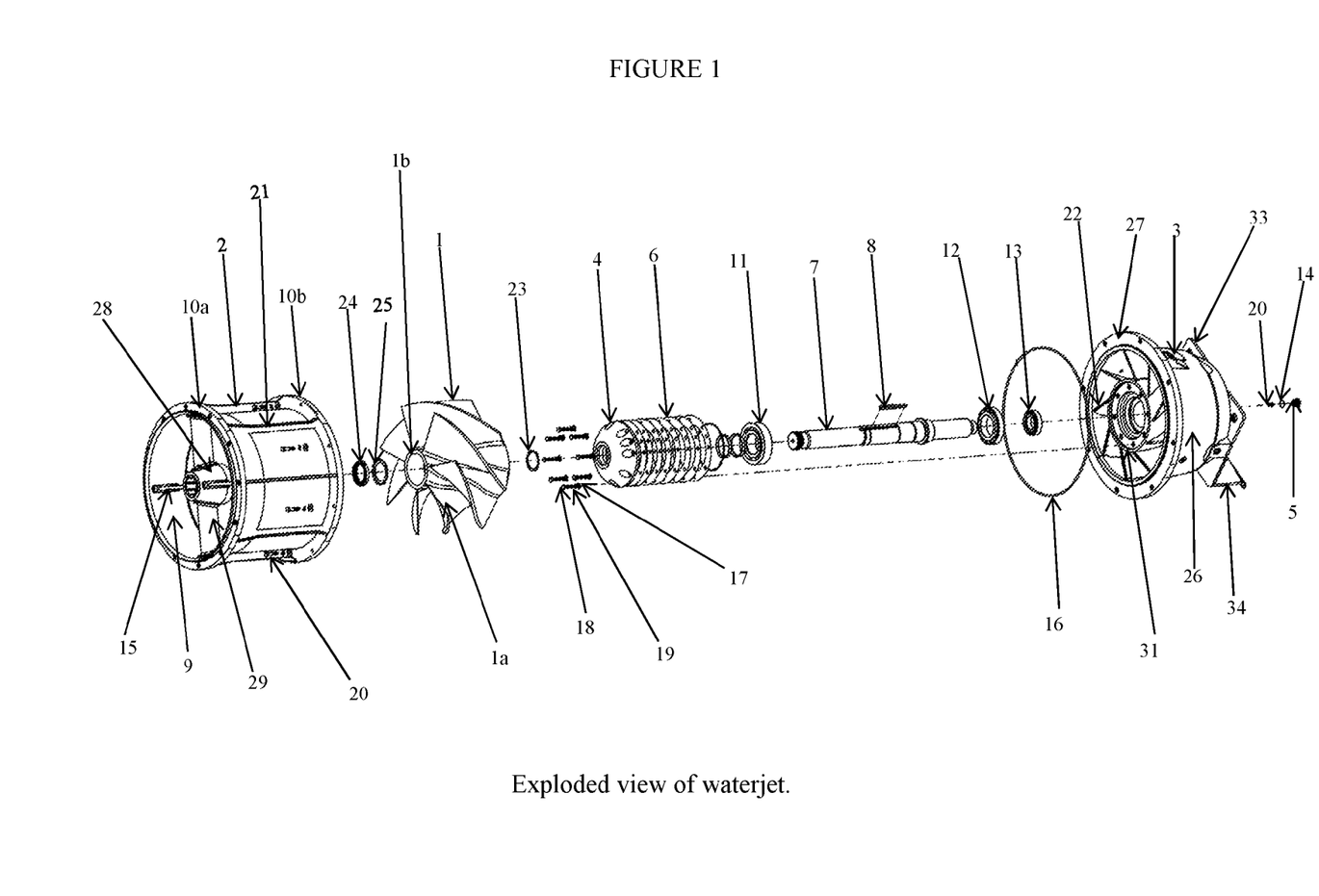
FIG. 1 is an exploded view of the waterjet which depicts the components of one embodiment of the waterjet.
Figure 2:
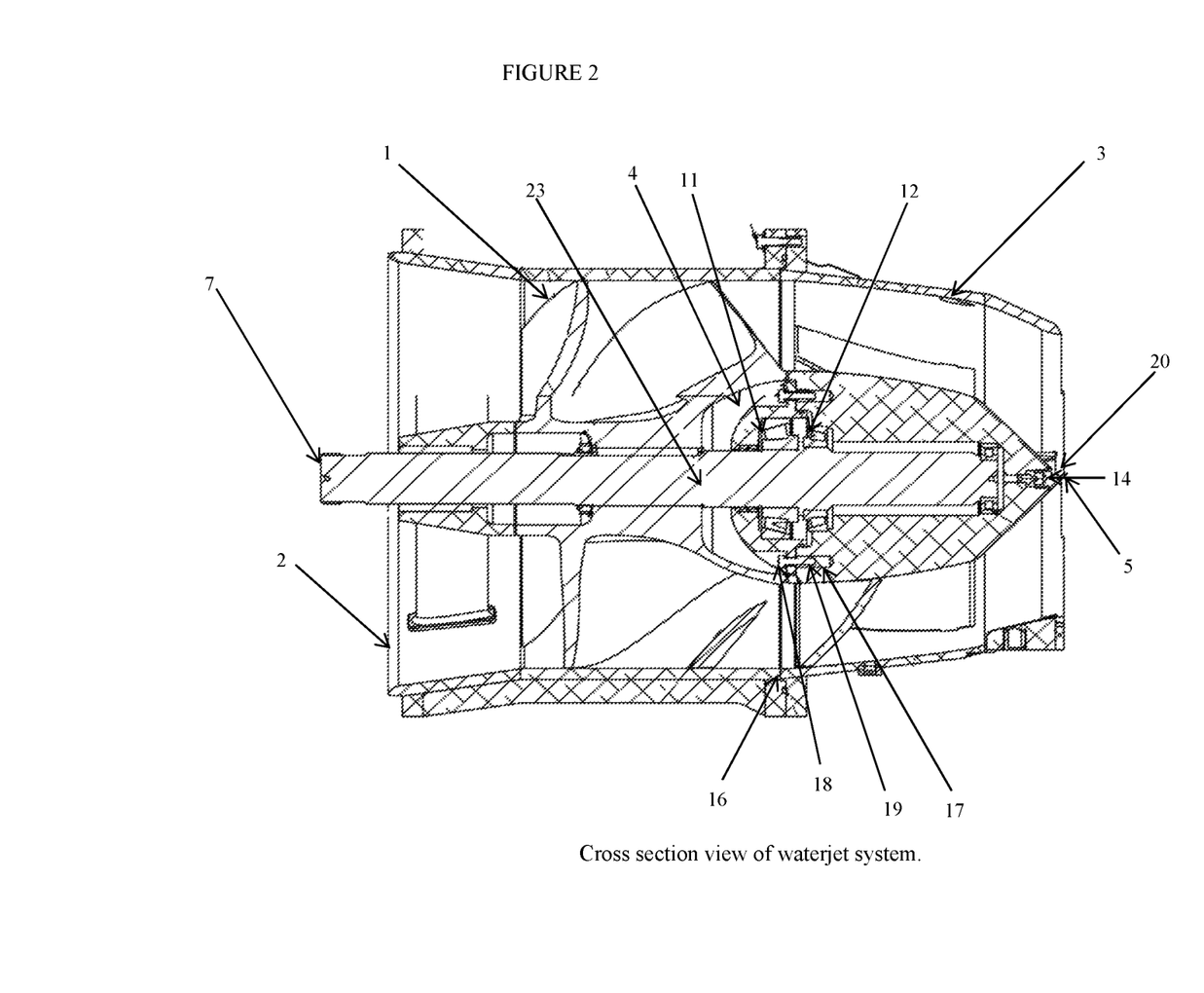
FIG. 2 is a cross section view of the waterjet in FIG. 1 that illustrates the placement and connecting means of the waterjet.
Figure 5:
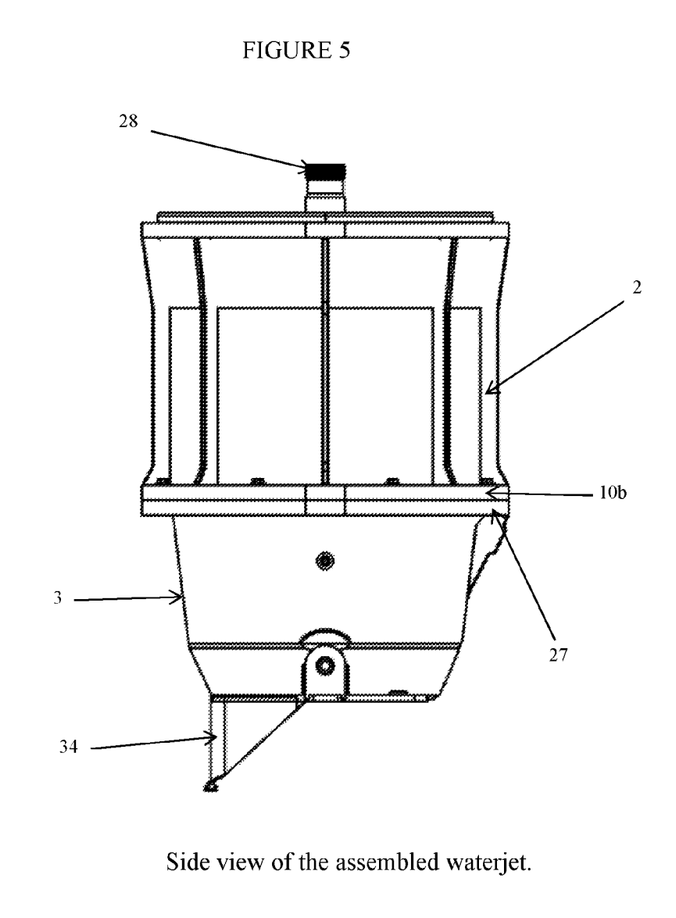
FIG. 5 is a side view of the assembled waterjet. It depicts the connections between the stator assembly and inlet assembly as well as the stator assembly nozzle and outer flap on the stator assembly.

In one embodiment, the waterjet 40 comprises an inlet assembly 2, an impeller 1, a drive shaft 7, a stator assembly 3, and a connecting means that comprises squared edges 33 on the stator assembly 3. FIGS. 1 and 2 depict one embodiment of the disclosed waterjet 40. FIG. 5 depicts that same embodiment in a side view.

Turning to FIGS. 1, 2, and 5, the inlet assembly 2 of the disclosed waterjet 40 comprises a round inlet assembly conduit 9, stator assembly struts 29, and an end piece 28. The end piece 28 aids in allowing the impeller drive shaft 7 of the waterjet 40 to be coupled with the main drive shaft of the vessel. The end piece 28 is frustum shaped and along with a lock washer 25 and lock nut bearing 24, facilitates the impeller drive shaft 7 rotation and coupling to the vessel's engine and drive shaft. The stator assembly struts 29 are located at the forward most end of the inlet assembly conduit 9 and are connected at one end to the inside of the inlet assembly conduit 9 and at the other end to the inlet end piece 28. The inlet assembly 2 can comprise any suitable metal or composition material that can withstand marine conditions. In one embodiment, the inlet assembly 2 is made of aluminum.

Figure 4:
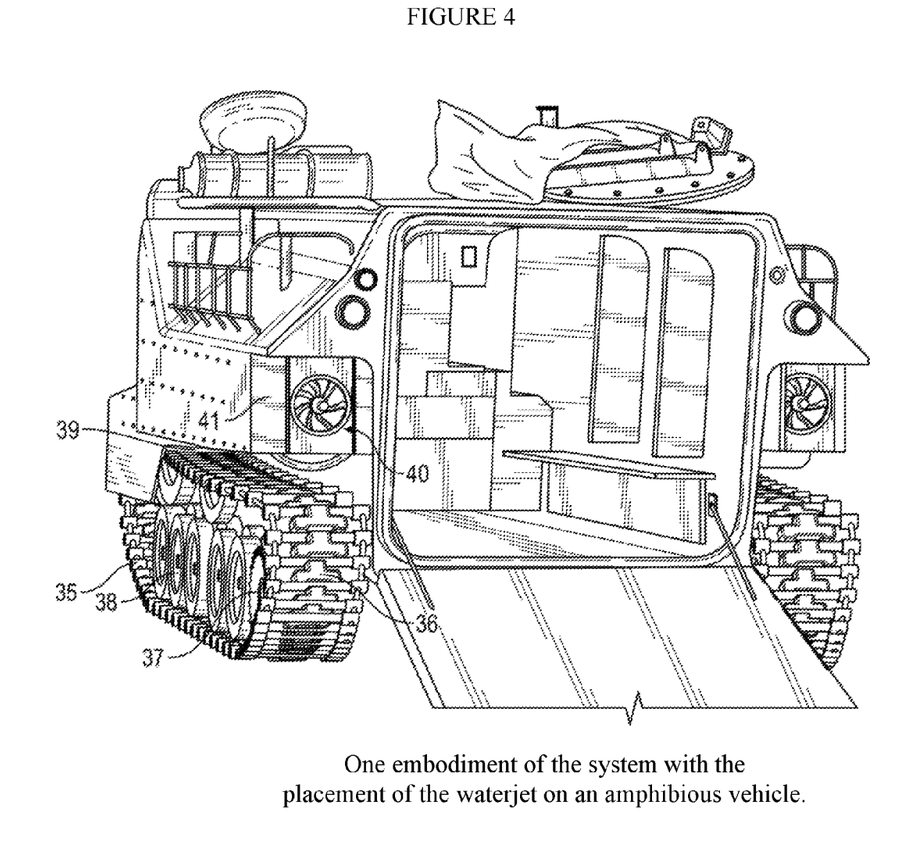
FIG. 4 depicts one embodiment of the system with the placement of the waterjet on an amphibious vessel. It demonstrates the spatial and volume constraints of the waterjet.

The size of the inlet assembly conduit 9 is dictated by the volume of the propulsion housing compartment 41 on the stern of the vessel, depicted in FIG. 4. The inlet assembly conduit 9 is diametrically smaller than the propulsion housing compartment 41 and its length is large enough to accommodate the impeller 1 inside the inlet assembly conduit 9. In one embodiment, the inlet assembly conduit 9 is 17 inches in length. In one or more embodiments, the inlet assembly conduit 9 has a leak-proof casing 21 made of aluminum. In one embodiment, the outer diameter of the leak-proof casing 21 of the inlet assembly conduit 9 is between 20 inches and 25 inches.

The inlet assembly conduit 9 has connecting means 10a and 10b on both ends. On one end it connects to the stator assembly 3. On the other end it connects to the vessel's structure at the intake 39. In the depicted embodiment, the connecting means comprises a lip 10a and 10b on both ends of the inlet assembly conduit 9 and a plurality of bolts. The stator assembly 3 also has a lip 27 that sits flush to the inlet assembly conduit lip 10b. The bolts go through both the lip 27 on the stator assembly 3 and the lip 10b on the inlet assembly conduit 9. On the other end, the lip 10a of the inlet assembly conduit 9 is bolted to a frame connected to the inside of the outer armor of the vessel and is secured using a plurality of bolts. This type of connection to the vessel's structure allows the waterjet 40 to be removed with simple tools and relative ease. In additional embodiments, other connecting means may be used that provide similar removal methods such as fasteners and studs that are fixed to the vehicle.

The inlet assembly struts 29 are located forward of the impeller 1 and are connected to the inside of the inlet assembly conduit 9. The inlet assembly struts 29 provide structural support for the inlet assembly 2. As depicted, the inlet assembly struts 29 are equidistant from each other and any suitable number of inlet assembly struts 29 or distance between them may be used to provide the requisite support without impeding water flow. In the depicted embodiment, there are four inlet assembly struts 29 that are spread out around the inner diameter of the inlet assembly conduit 9 in a manner such that each is equidistant from the next. The inlet assembly struts 29 are necessarily smaller in length than the radius of the inlet assembly conduit 9. In one embodiment the inlet assembly struts 29 are between 5 inches and 10 inches long. Each inlet assembly strut 29 is connected at one end to the inlet assembly conduit 9 and at the other end to the end piece 28.

Figure 3:
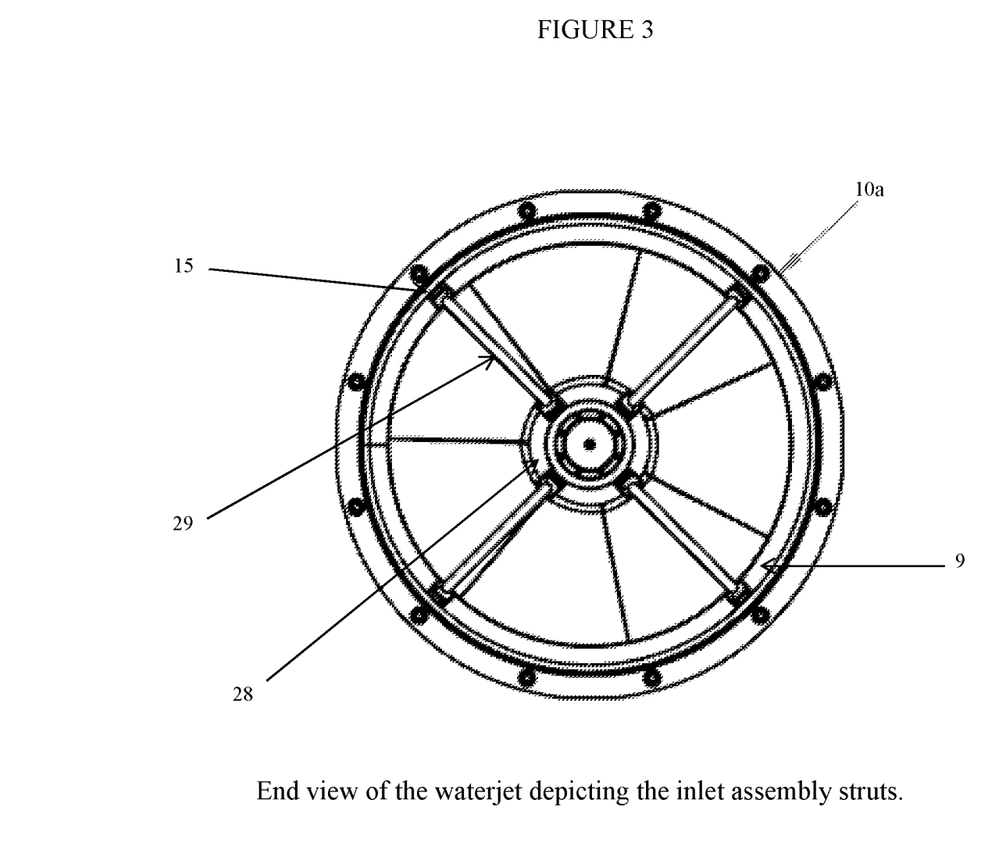
FIG. 3 is an end view of the waterjet. It depicts the struts and the welds between the stator assembly struts and stator assembly nozzle and the stator assembly struts and the stator assembly conduit.

In one embodiment the interface of the inlet assembly struts 29 and inlet assembly conduit 9 and inlet assembly struts 29 and end piece 28 are connected by welds. At the weld interface, a piece of metal is used as a mounting bracket that forms an assembly weld pad 15 transverse to the end of each inlet assembly strut 29 around the perimeter of the edge of the inlet assembly strut 29 and flush with the inner surface of the inlet assembly conduit 9 on one end and flush with the end piece 28 on the other end. FIG. 3 depicts the inlet assembly struts 29 and inlet assembly weld pads 15. As depicted in FIG. 3, each inlet assembly strut assembly has a cross section similar to an I-beam or H-beam, wherein the assembly weld pads 15 act as the horizontal flanges of the beams and the inlet assembly struts 29 act as the longitudinal web element. The depicted assembly weld pads 15 comprise an elongated oval shape and follow the entire perimeter of the inlet assembly strut 29, although it is understood that the strut assembly weld pads 15 can be any number of shapes that will increase the surface area for welding such as triangular, square, parallelogram, rectangular, or other shapes as would be recognized by the art. The welds are made around the outer perimeter of the strut assembly weld pads 15 on each end. In prior applications without the disclosed strut assembly weld pads 15, the change in thickness between the thinner inlet assembly struts 29 and thicker inlet assembly conduit wall 9 and end piece 28 is a source of weld and structural failure. The strut assembly weld pads 15 create a more gradual and smaller change in thickness between the inlet assembly struts 29 and the inlet assembly conduit wall 9 and end piece 28. By adding the strut assembly weld pads 15 to the inlet assembly struts 29, the strength of the weld connections are buttressed and reinforced against fatigue and structural failure caused by forces experienced during land use on the marine based inlet assembly 2. In an alternate embodiment, the strut assemblies which comprise inlet assembly struts 29 and assembly weld pads 15, comprise an I-beam, although a truncated I-beam to fit the space perimeters of the inlet assembly conduit 9.

The impeller 1 is located aft of the inlet assembly struts 29 inside of the inlet assembly conduit 9 and comprises a plurality of impeller blades 1a and a hub 1b. The impeller 1 is designed to avoid cavitation and to operate at both high and low RPM to produce thrust even at low speeds. In one embodiment, the impeller blades 1a overlap and the impeller 1 has a progressive pitch wherein the pitch is smaller at the leading edge and transitions to a larger pitch at the trailing edge. In one embodiment, the leading edge is between 60 and 66 degrees off axis and the trailing edge is between 35 and 40 degrees off axis. In one embodiment, there are 7 impeller blades 1a on the impeller 1. The impeller 1 size is necessarily dictated by the volume of the propulsion compartment on the stern of the vessel. In one embodiment, the impeller 1 has an 18 inch diameter. The impeller 1 can comprise any suitable metal or composition material that can withstand marine conditions. In one embodiment, the impeller 1 is made of stainless steel. In one embodiment, the stainless steel is grade 316L.

The stator assembly 3 is located aft of the impeller 1 and comprises a second conduit 26, a stator assembly nozzle 31, and fixed vanes 22. The stator assembly 3 can comprise any suitable metal or composition material that can withstand marine conditions. In one embodiment, the stator assembly 3 is made of aluminum. The stator assembly 3 is connected to the inlet assembly 2 at one end through a lip 27 and a plurality of bolts and is open outward at the stern of the vessel on the other end. In one embodiment, the second conduit 26 has a circular cross section at the end connected to the inlet assembly 2 and tapers on the other end.

In one embodiment, the second conduit 26 has a leak-proof casing made of aluminum. In one embodiment, one end of the casing is rounded like the lip of the second conduit 26 and the other end of the casing has a connecting means comprising squared edges 33. The end that has squared edges 33 opens outward at the stern of the vessel. In one embodiment, the second conduit casing has a flap 34 along one of the squared edges 33 that integrates the waterjet 40 with the vessel.

The stator assembly nozzle 31 has an inner, conical shape and a plurality of fixed vanes 22 connected to it that are used to straighten the water by redirecting the swirling flow that leaves the impeller 1 into non-swirling flow. The fixed vanes 22 remove the rotating component of the water flow, breaking up the swirls, to align the velocity components parallel to the walls of the stator assembly 3. In one embodiment, the fixed vanes 22 are angled with respect to the inner wall of the second conduit 26 and equidistant. The fixed vanes 22 are necessarily shorter in length than the diameter of the second conduit 26. In one embodiment, the fixed vanes 22 are 8 inches in length. The fixed vanes 22 are connected along the other edge to the inside of the second conduit 26.

The forward end of the stator assembly nozzle 31 is in communication with the impeller 1 through a plurality of connecting components that allow for rotation of the impeller drive shaft 7. In one embodiment, those connecting means comprise a plurality of bearing shims 6 and a forward bearing housing 4, and use a plurality of flat washers 17, hex bolts 18, lock washers 19, and an o-ring 16.

The impeller drive shaft 7 transmits torque and rotation to the impeller 1. The length of the impeller drive shaft 7 is dictated by the size of the waterjet 40. In one embodiment, the impeller drive shaft 7 is 30 inches. The impeller drive shaft 7 is an elongated circular cross-sectional body and has a drive shaft key 8 towards the middle of the impeller drive shaft 7. The impeller drive shaft 7 can be made of any metal or composite suitable for drive shafts in marine applications. In one embodiment, the impeller drive shaft 7 is made of stainless steel. In one embodiment, the stainless steel is grade 17-4PH.

There are bearings on either end of the impeller drive shaft 7 to maintain the position of the impeller 1 and a retaining ring 23 on the end of the impeller drive shaft 7 that is connected to the inlet assembly 2. In one embodiment, a bearing such as a tapered roller radial bearing 12 and a cylindrical bearing 13 is used at the end of the impeller drive shaft 7 that is connected to the stator assembly 3 and a bearing such as a tapered roller thrust bearing 11 is used at the other end of the impeller drive shaft 7 that is connected to the inlet assembly 2. In one embodiment, the bearings are made of steel alloy. In one embodiment, the stator has a leak-proof fitting 20, o-ring 14, and plug 5 to grease the bearings without removal.

It is possible to adapt the watercraft propulsion system to a variety of marine and amphibious vessels such as boats, ships, offshore ships, pilot ships, search and rescue ships, recreational ships, military ships, ferries, submarines, remote operated vehicles, UUVs, and other amphibious vessels. In one or more embodiments, the waterjet propulsion system is designed to interface with existing steering and drive mechanisms on the vessel. This allows existing vessels to be retrofitted with the disclosed watercraft propulsion system. FIG. 4 depicts one embodiment of an amphibious vessel with the watercraft propulsion system.

Although not depicted in FIG. 4, it will be readily appreciated by a person skilled in the art that a steering bucket can be mounted rotatably and mechanically behind the nozzle of the waterjet for steering and reversing functions. The steering bucket is rectangular with a rounded edge in the shape of a scoop on one side and connecting means on the other side. The bucket is made of any metal or composite that is suitable for marine application. The bucket can be moved into the water stream exiting the nozzle to deflect the water stream forward and create reverse thrust. The bucket can also be gradually moved into the water stream so that only a part of the stream is deflected to continuously control the directional thrust. The bucket controls are in electronic communication with the main steering and reversing controls of the vessel.

The waterjets are driven by the vessel's engine with the vessel's drive shaft and gear box (not pictured). In one embodiment the engine is a diesel engine but the engine may also be driven by gasoline instead. In another embodiment the engine is a gas turbine. In another embodiment, an electric motor drives the waterjets. In yet another embodiment, a hydraulic motor drives the waterjets. The impeller drive shaft 7 of the waterjet 40 is coupled with the main vessel drive shaft by a suitable coupling which is driven through a gear box and the vessel's engine. This allows preexisting vessels to be retrofitted with the waterjet propulsion system. Therefore, the waterjets operate at design parameters set by the vessel's thrust, power, RPM, and efficiency ranges. In one embodiment, those parameters are 4,000 to 4,500 pounds-force, 250-290 Horsepower, 900-950 RPM, and Froude numbers less than 0.7, respectively. In additional embodiments, each parameter may vary based on the design inputs and outputs of the preexisting engine and application requirements.

In embodiments wherein the waterjet is coupled to an amphibious vessel such as an AAV, the vessel may also comprise land-based propulsion means. In one embodiment, depicted in FIG. 4, the land-based propulsion means comprises a power driven continuous track 35 on either side of the vessel. The continuous track 35 comprises a plurality of individual treads 36 that combine to form a continuous section. In one embodiment, the track 35 is trained around at least one sprocket 37 and a plurality of equidistant wheels 38. A transmission allows power transfer between the engine and the at least one drive sprocket 37 on each side of the vessel.

The disclosed waterjets 40 provide water propulsion for the vessel by adding energy to a water stream and forcing the water outward at the stern. The sea water is ingested into the system through the intake 39. In one embodiment, as depicted in FIG. 4, the intake 39 is through the tracks 35 of the vessel and the clearance 39 between the continuous tracks 35 and the body of the vessel. The water is then forced through the stator assembly struts 29 and through the impeller 1. The rotating impeller 1 impels water aft through the second conduit 26 and the fixed vanes 22 straighten the flow. The stator assembly nozzle 31 and the tapered end of the stator assembly 3 expel the water and the reaction force propels the boat forward.

The waterjets 40 are housed on the stern of the vessel. In the depicted embodiment, the waterjets are located on either side of the vessel above the tracks 35. In this embodiment, on the more aft end that opens outward at the stern, the waterjets 40 are connected by the connecting means comprising the squared edges 33 of the stator assembly casing using bolts. In one embodiment, there are two bolts. On the more forward end, the waterjets 40 are connected by the lip of the inlet assembly 10*a* which is attached to a frame inside the outer armor of the vessel using bolts. In one embodiment, eight bolts are used. By attaching the waterjet 40 in this manner, with only a plurality of bolts, the waterjet 40 may be removed from the vessel with simple tools and relatively quickly. Each bolt is removed with a socket wrench or other tool capable of removing bolts and the entire waterjet 40 can be taken away for maintenance or replacement. In additional embodiments, other connecting means may be used that provide similar removal methods such as fasteners and studs that are fixed to the vehicle. In one embodiment, there is a propulsion housing compartment 41 on the side of the vessel that covers the waterjet propulsion systems.

For the purpose of understanding the Watercraft Propulsion System, references are made in the text to exemplary embodiments of a waterjet propulsion system, only some of which are described herein such as the one coupled to an AAV. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Likewise, reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

The invention claimed is:

1. A watercraft propulsion system connected to a vessel comprising an intake that ingests water, at least one waterjet, and a steering and reversal means, wherein the waterjet comprises an impeller that further comprises a hub and a plurality of overlapping blades with a leading edge, trailing edge, and a progressive pitch; an inlet assembly with two ends and a lip on each end, the inlet assembly further comprising a first conduit with a leak proof casing, a plurality of strut assemblies, and an end piece; a stator assembly with two ends and a lip on each end, one end is inboard and the other end faces the stern of the vessel and opens outwardly, the stator assembly further comprises a second conduit, a nozzle, and a plurality of fixed vanes to redirect the swirling flow received from the impeller; an impeller drive shaft; and a connecting means that connects the waterjet to the vessel, a. wherein the inlet assembly connects to the intake at one end and to the stator assembly at the other end with a plurality of bolts that pass through the lip of the inlet assembly;
   b. wherein the strut assemblies provide structural support to the inlet assembly and comprise an elongated member with two ends and a pad on each end transversely extending with respect to the elongated member, the pad further comprising a metal or composite capable of being welded;
   c. wherein the struts assemblies are connected at one end to the inlet conduit and connected at the other end to the end piece;
   d. wherein the inlet assembly end piece is frustum shaped and allows for rotation of the impeller drive shaft;
   e. wherein the stator assembly vanes have two ends and are fixed, and angled and are connected to the inside of the second conduit on one end and the nozzle on the other end; and
   f. wherein the impeller is located inside of the inlet assembly conduit aft of the inlet assembly struts.

2. The watercraft propulsion system of claim 1 wherein the connecting means comprises a plurality of bolts that are located around the aft-most end of the lip of the stator assembly and the forward-most end of the lip of the inlet assembly lip, the lip of the inlet assembly having at least one bolt and the lip of the stator assembly having at least one bolt.

3. The watercraft propulsion system of claim 1 wherein at least a component of the inlet assembly conduit comprises aluminum.

4. The watercraft propulsion system of claim 1 wherein the strut assemblies comprise an I-beam.

5. The watercraft propulsion system of claim 1 wherein the struts are connected to the first conduit and the end piece by welds that are made around the perimeter of the strut pads.

6. The watercraft propulsion system of claim 1 wherein there are four struts that are equidistant from each other.

7. The watercraft propulsion system of claim 1 wherein the impeller leading edge is between 60 and 66 degrees off axis and the impeller trailing edge is between 35 and 40 degrees off axis.

8. The watercraft propulsion system of claim 1 wherein the stator assembly tapers at the end that opens outwardly.

9. The watercraft propulsion system of claim 1 wherein at least one component of the stator assembly comprises aluminum.

10. The watercraft propulsion system of claim 1 wherein the impeller drive shaft comprises a shaft key and bearings on either end of the drive shaft to maintain the position of the impeller, the bearings being a tapered roller radial bearing at the end that is connected to the stator assembly and a tapered roller thrust bearing at the end that is connected to the inlet assembly.

11. The watercraft propulsion system of claim 1 wherein the waterjet is connected to a vessel selected from a group comprising offshore ships, pilot ships, search and rescue ships, recreational ships, military ships, ferries, and amphibious vehicles, the vessel further comprising steering and reversal controls.

12. The watercraft propulsion system of claim 11 wherein the steering and reversal means comprises a steering bucket rotatably and mechanical connected to the aft end of the nozzle, and wherein the steering bucket is in electronic communication with the steering and reversal controls of the vessel.

13. An amphibious vessel comprising:
  a. a body comprising a upper and lower part, the upper part having a compartment to hold at least one occupant and the lower part being boat hull-shaped, the body having a first side and a second side;
  b. a land propulsion means comprising a continuous track on both sides of the vessel driven by at least one drive sprocket on each side, a plurality of wheels, an engine, and a transmission that allows power transfer between the engine and the drive sprocket, the track comprising a plurality of individual treads that combine to form a continuous section;
  c. a water propulsion means comprising two waterjets, one on the first side and one on the second side of the vessel and spaced equidistant from the longitudinal axis of the vessel, an intake that is through the tracks and the clearance between the tracks and the body, a gearbox that allows power transfer between the land propulsion means engine and the waterjets, and a steering and reversal means, wherein each waterjet comprises an impeller that further comprises a hub and a plurality of overlapping blades with a leading edge, trailing edge, and a progressive pitch; an inlet assembly with two ends and a lip on each end, the inlet assembly further comprises a conduit with a leak proof casing, a plurality of strut assemblies, and an end piece; a stator assembly with two ends and a lip on each end, one end is inboard and the other end faces the stern of the amphibious vessel and opens outwardly to the water or air, the stator assembly further comprises a second conduit, a nozzle, and a plurality of fixed vanes to redirect the swirling flow out of the impeller; an impeller drive shaft; and a connecting means that connects the waterjet system to the amphibious vessel,
  d. wherein the inlet assembly connects to the intake at one end and to the stator assembly at the other end with a plurality of bolts that pass through the lip of the inlet assembly;
  e. wherein the strut assemblies provide structural support to the inlet assembly and comprise an elongated member with two ends and a pad on each end transversely attached to the elongated member, the pad further comprising a metal or composite capable of being welded;
  f. wherein the struts assemblies are connected at one end to the inlet conduit and connected at the other end to the end piece;
  g. wherein the inlet assembly end piece is frustum shaped and allows for rotation of the impeller drive shaft;
  h. wherein the stator assembly vanes have two ends and are fixed and angled and are connected to the inside of the second conduit on one end and the nozzle on the other end;
  i. wherein the impeller is located inside of the inlet assembly conduit aft of the inlet assembly struts; and
  k. wherein, the steering and reversal means comprises a steering bucket rotatably and mechanical connected to the aft end of the nozzle, and wherein the steering bucket is in electronic communication with the steering and reversal means.

14. The amphibious vessel of claim 13 wherein the connecting means comprises a plurality of bolts that are located around the aft-most end of the lip of the stator assembly and the forward-most end of the lip of the inlet assembly lip, the lip of the inlet assembly having at least one bolt and the lip of the stator assembly having at least one bolt.

15. The amphibious vessel of claim 13 wherein at least a component of the inlet assembly conduit comprises aluminum.

16. The amphibious vessel of claim 13 wherein the strut assemblies comprise an I-beam.

17. The amphibious vessel of claim 13 wherein the struts are connected to the inlet conduit and the end piece by welds that are made around the perimeters of the strut pads.

18. The amphibious vessel of claim 13 wherein there are four struts that are equidistant from each other.

19. The amphibious vessel of claim 13 wherein the impeller leading edge is between 60 and 66 degrees off axis and the impeller trailing edge is between 35 and 40 degrees off axis.

20. The amphibious vessel of claim 13 wherein the stator assembly tapers at the end that opens outwardly.

21. The amphibious vessel of claim 13 wherein at least one component of the stator assembly comprises aluminum.

22. The amphibious vessel of claim 13 wherein the impeller drive shaft comprises a shaft key and bearings on either end of the drive shaft to maintain the position of the impeller, the bearings being a tapered roller radial bearing at the end that is connected to the stator assembly and a tapered roller thrust bearing at the end that is connected to the inlet assembly.

23. The amphibious vessel of claim 13 wherein the waterjets are designed to operate at preexisting vessel parameters, said preexisting vessel parameters being thrust, power, revolutions per minute, and Froude number.

24. The amphibious vessel of claim 23 wherein the vessel parameters are 4,000 to 4,500 pounds-force of thrust, 250-290 horsepower, 900-950 RPM, and Froude numbers less than 0.7.

\* \* \* \* \*